US009679327B2

(12) United States Patent
Herring et al.

(10) Patent No.: US 9,679,327 B2
(45) Date of Patent: Jun. 13, 2017

(54) VISUAL CHECKOUT WITH CENTER OF MASS SECURITY CHECK

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Jeffrey John Smith, Raleigh, NC (US); Edward John Vitek, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 69 days.

(21) Appl. No.: 14/659,169

(22) Filed: Mar. 16, 2015

(65) Prior Publication Data

US 2016/0109281 A1 Apr. 21, 2016

Related U.S. Application Data

(60) Provisional application No. 62/064,323, filed on Oct. 15, 2014.

(51) Int. Cl.
*G06F 15/00* (2006.01)
*G01N 5/00* (2006.01)
(Continued)

(52) U.S. Cl.
CPC ......... *G06Q 30/0633* (2013.01); *G01B 11/00* (2013.01); *G01G 19/4144* (2013.01);
(Continued)

(58) Field of Classification Search
CPC .. G06K 9/00577; G06K 9/00624; G06K 9/52; G06K 2209/17; G06K 9/00288;
(Continued)

(56) References Cited

U.S. PATENT DOCUMENTS 4,615,403 A * 10/1986 Nakamura ............. G01G 11/12
177/121
5,753,866 A * 5/1998 Ikeda ................... G01G 19/393
177/119

(Continued)

OTHER PUBLICATIONS

Huber-Mörk, Reinhold et al., Automatic Coin Classification and Identification, Advances in Object Recognition Systems, May 9, 2012, pp. 127-156, InTech, Rijeka, Croatia.

*Primary Examiner* — Randy Gibson
(74) *Attorney, Agent, or Firm* — Patterson+Sheridan, LLP (57) ABSTRACT

A method, computer program product, and system for providing a security check of items being purchased by a consumer. A digital image of items for purchase arranged on a scale is captured. An estimated total weight and a cumulative center of mass of the items are estimated. An actual total weight and cumulative center of mass of the items are measured using the scale. If the estimated total weight of the items differs from the actual total weight by more than a first threshold amount and/or if the estimated cumulative center of mass of the items differs from the measured cumulative center of mass by more than a second threshold amount, an alert can be output. The alert can include an instruction for the customer or a store employee to rearrange the items on the scale to attempt to resolve the discrepancy.

20 Claims, 6 Drawing Sheets (51) Int. Cl.
G01G 19/414 (2006.01)
G06Q 20/18 (2012.01)
G06Q 30/06 (2012.01)
G06K 9/20 (2006.01)
G06K 9/00 (2006.01)
G01S 19/13 (2010.01)
G06Q 20/20 (2012.01)
G06Q 20/32 (2012.01)
G06Q 30/00 (2012.01)
H04N 5/225 (2006.01)
H04N 7/18 (2006.01)
G06Q 30/02 (2012.01)
G06K 9/62 (2006.01)
G06K 9/78 (2006.01)
G06F 1/16 (2006.01)
G06F 3/01 (2006.01)
G06K 9/46 (2006.01)
G06T 11/60 (2006.01)
H04N 5/232 (2006.01)
G07G 1/00 (2006.01)
G01B 11/00 (2006.01)
G06T 7/66 (2017.01)
G01G 19/40 (2006.01)

(52) U.S. Cl.
CPC .............. *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 20/18* (2013.01); *G06Q 20/204* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0623* (2013.01); *G06Q 30/0629* (2013.01); *G06Q 30/0631* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0063* (2013.01); *G07G 1/0072* (2013.01); *H04N 5/225* (2013.01); *H04N 5/232* (2013.01); *H04N 7/181* (2013.01); *G01G 19/40* (2013.01); *G06K 2009/00328* (2013.01); *G06K 2209/17* (2013.01); *G06T 2207/30232* (2013.01)

(58) Field of Classification Search
CPC ........... G06K 9/00255; G06K 9/00362; G06K 9/209; G06K 9/78; G06K 9/6267; G06K 9/6201; G06K 2009/00328; G06K 9/00536; G06K 9/46; G06Q 30/0633; G06Q 30/0639; G06Q 20/322; G06Q 20/209; G06Q 30/0635; G06Q 30/0224; G06Q 30/0623; G06Q 30/0609; G06Q 20/204; G06Q 30/016; G06Q 30/0235; G06Q 30/0251; G06Q 30/0269; G06Q 20/18; G06Q 30/0631; G06Q 30/0629; G06T 11/60; G06T 7/0069; G06T 7/2093; G06T 2207/30232; G06F 3/013; G06F 1/163; G06F 3/012; H04N 5/232; H04N 5/225; H04N 7/181; G01S 19/13; G07G 1/0045; G07G 1/0063; G07G 1/0072; G01G 19/4144; G01G 19/40
See application file for complete search history.

(56) References Cited

U.S. PATENT DOCUMENTS

| | | | |
|---|---|---|---|
| 5,838,839 A | 11/1998 | Seki et al. | |
| 6,005,959 A * | 12/1999 | Mohan | G01B 11/024 348/89 |
| 6,250,671 B1 * | 6/2001 | Osmer | G01G 19/4142 180/271 |
| 6,685,000 B2 | 2/2004 | Sugata et al. | |
| 7,180,014 B2 * | 2/2007 | Farber | G06Q 10/087 177/25.19 |
| 7,533,799 B2 | 5/2009 | Edwards | |
| 7,778,481 B2 | 8/2010 | Watanabe | |
| 7,893,811 B2 | 2/2011 | Augustyniak et al. | |
| 7,909,248 B1 | 3/2011 | Goncalves | |
| 8,218,816 B2 | 7/2012 | Sonoura | |
| 8,430,311 B2 | 4/2013 | Ostrowski et al. | |
| 8,474,715 B2 | 7/2013 | Goncalves | |
| 8,494,909 B2 | 7/2013 | Goncalves | |
| 8,571,298 B2 | 10/2013 | McQueen et al. | |
| 8,732,024 B2 | 5/2014 | Jacobs | |
| 8,876,001 B2 | 11/2014 | Herwig et al. | |
| 9,417,115 B2 * | 8/2016 | Tamai | G01G 19/387 |
| 2005/0097064 A1 * | 5/2005 | Werden | G01G 19/4144 705/400 |
| 2009/0093305 A1 | 4/2009 | Okamoto et al. | |
| 2011/0129117 A1 * | 6/2011 | Ross | G06K 9/2018 382/103 |
| 2012/0259582 A1 * | 10/2012 | Gloger | B25J 11/00 702/173 |
| 2014/0182953 A1 | 7/2014 | Dee et al. | |
| 2014/0338987 A1 | 11/2014 | Kobres | |
| 2016/0217449 A1 * | 7/2016 | Takeno | G06Q 20/208 |

* cited by examiner

VISUAL CHECKOUT WITH CENTER OF MASS SECURITY CHECK

RELATED APPLICATIONS

This application claims the benefit of U.S. Provisional Application No. 62/064,323, filed on Oct. 15, 2014, the entire contents of which are incorporated by reference herein.

DETAILED DESCRIPTION

Self-checkout kiosks at retail establishments are an increasingly popular option for consumers and businesses. Businesses do not have to employ as many cashiers when self-checkout kiosks are used. For example, a single cashier or employee can monitor the use of several different self-checkout kiosks, assisting customers when there is a problem. Furthermore, in many instances, self-checkout kiosks can include more available checkout lanes then checkout stations manned by cashiers. For example, a grocery store may have a total of ten checkout stations to be manned by cashiers. However, during times of day when customer traffic is expected to be low, only one or two of those ten checkout stations may be manned. Consequently, if more customers are in the store than expected or if several customers attempt to check out at the same time, those customers would have to wait in queue for the cashiers to process their transactions. Alternatively, if the same grocery store has ten self-checkout kiosks, those self-checkout kiosks are always available. So long as a sufficient number of self-checkout kiosks are provided to handle the heaviest expected customer traffic, customer wait times to check out should be kept to a minimum.

In the future, self-checkout kiosks may be used in combination with "touchless commerce," meaning items in a customer's shopping cart do not need to be touched to facilitate a transaction. Simply put, the items that a customer places in his shopping cart or basket can be tracked so that when the customer approaches a self-checkout kiosk, the total price for the items can be tallied and the customer can quickly pay for the items. In various instances, the customer may be able to pay through the use of facial recognition technology in the store that recognizes the customer and automatically charges an account associated with the recognized customer. One hindrance to such "touchless commerce" is providing security and purchase verification. A store wants to make sure that customers only pay for items they are purchasing and that customers do not take items for which they have not paid. Aspects described herein provide a fast security check by capturing one or more images of items in a customer's shopping cart or basket, estimating the total weight and center of mass of the items based on the captured image(s), and comparing the estimated weight and center of mass to a measured total weight and center of mass. If the estimated weight and center of mass are within threshold limits of the measured total weight and center of mass, then the items visible in the image likely include all of the items in the shopping cart or basket, in the customer can be charged for the items in the image. If the estimated weight and center of mass are outside of threshold limits of the measured total weight and center of mass, then it is possible that one or more items in the customer's shopping cart or basket are not visible in the one or more images. An alert can then be generated that instructs the customer or a store employee to take actions to resolve such discrepancies.

Figure 1:
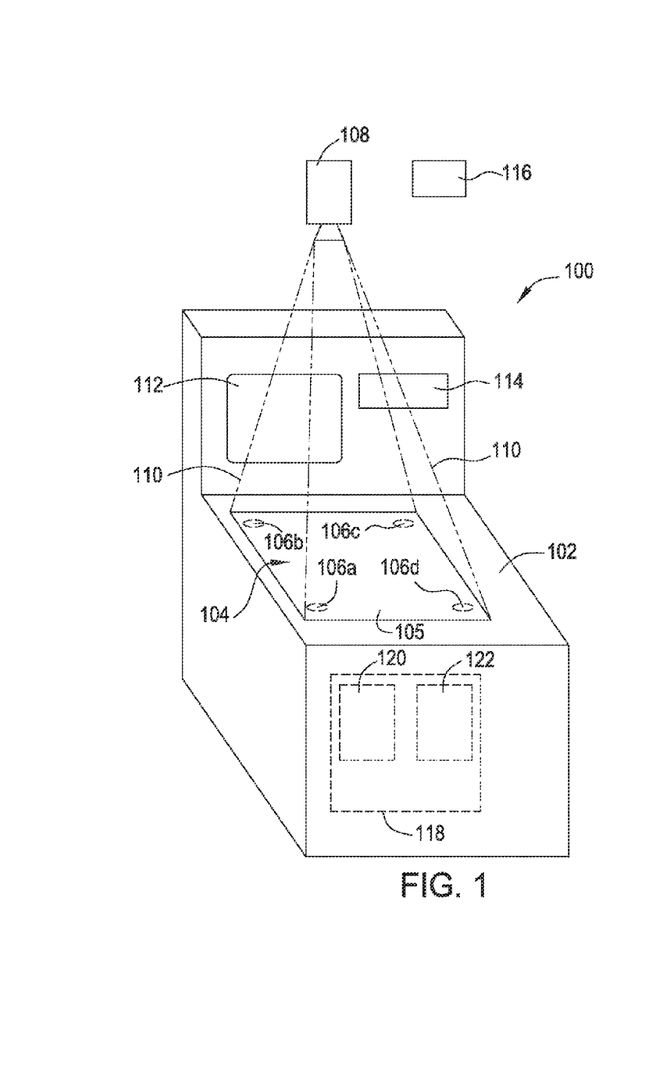
FIG. 1 is a perspective view of a check out kiosk with a scale and video camera according to at least one aspect.

FIG. 1 illustrates an exemplary kiosk 100 according to various aspects described herein. The kiosk 100 includes a housing 102 with a scale 104 arranged on the housing 102. The scale 104 includes a platen 105 that is supported by three or more load cells 106. FIG. 1 illustrates four load cells 106a, 106b, 106c, and 106d (collectively, load cells 106) supporting the platen 105. The four load cells 106a, 106b, 106c, and 106d are arranged in a geometrical pattern of a rectangle. In various other aspects, three load cells arranged in a geometric pattern of a triangle could support the platen 105. In various other aspects, five or more load cells arranged in a pentagon, hexagon, or other geometric pattern could support the platen 105. As described in greater detail below, each load cells carries a fraction of the total weight of items placed on the platen 105. By determining the fraction of the total weight carried by each of the load cells, a measured center of mass of the items on the platen 105 (i.e., a distribution of the weight of the items on the platen 105) can be determined.

The kiosk 100 can also include at least one video camera 108 oriented toward the platen 105. As shown in FIG. 1, the video camera 108 has a field of view 110 that covers the platen 105. The kiosk 100 can also include a computer system 118 that includes a processor 120 and computer memory 122. The computer system 118 can be in communication with the load cells 106 of the scale 104. The processor 120 can compute a total weight and center of mass of the items on the platen 105 based on the weight readings received from each of the load cells. The kiosk 100 can also include a display screen 112. The display screen 112 can display images, taken by the video camera 108, of the items on the platen 105. The display screen 112 can also provide information to the customer (and/or store employee) about the items in the cart or basket, such as identification of the items, estimated weights of the items, estimated centers of mass of the items, and estimated cumulative center of mass of all of the items. The display screen 112 can also provide information to the customer about the measured total weight of the items on the platen 105 and the measured center of mass of all of the items on the platen 105.

In various aspects, the kiosk 100 can include a payment module 114. The payment module 114 could include a card reader that can read credit cards, ATM cards, gift cards, or the like. The payment module 114 could also include a currency collector that can receive paper currency and/or coins. The payment module 114 could also include near field communication payment methods, such as Apple pay. The kiosk 100 can also include a light 116. In various instances, the light 116 could be illuminated to attract the attention of a store employee in the event that employee assistance is desired or needed.

Figure 2:
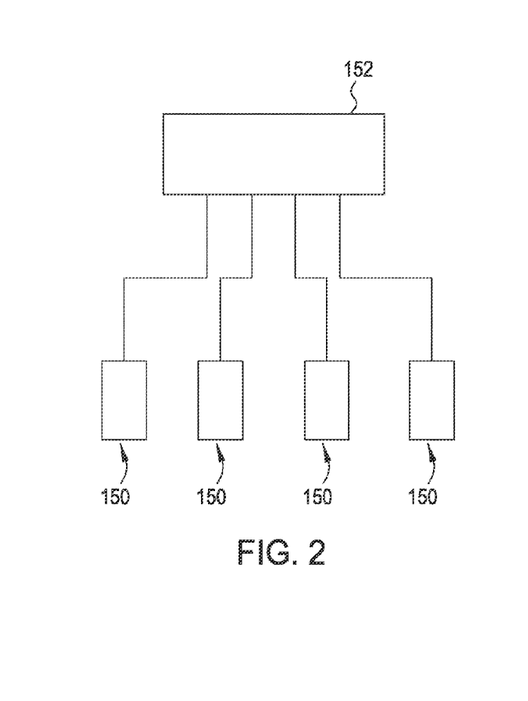
FIG. 2 is a schematic top view of several kiosks in communication with a computer server.

As will be discussed in greater detail below, the computer memory 122 of the computer system 118 can include a data structure (e.g., a database) that has weights and/or weight metrics for various items for sale in the store. For example, larger apples generally will be heavier than smaller apples. However, a certain variety of apple may tend to have a narrow range of densities (e.g., grams per cubic inch) such that if the volume of the apple can be estimated, then the weight can also be estimated. The density of a particular variety of apple could be stored in the data structure as a weight metric for that particular variety of apple. Another example of a weight metric for an apple could be a correlation factor between a size of the apple and a weight. For example, a particular varietal of apple could have correlation factor of 6 ounces for an apple that is less than 2.5 inches wide, 7 ounces for an apple that is between 2.5 inches wide and 3 inches wide, and 8 ounces for an apple that is more than 3 inches wide. Referring now to FIG. 2, in various instances, the computer system 118 and/or a computer memory (e.g., memory 122) storing the data structure with weights and/or weight metrics could be located in a central server 152. A plurality of kiosks 150 can be in communication with the server 152 to retrieve weights and/or weight metrics for items identified in an image of a customer's shopping cart or basket.

Figure 3:
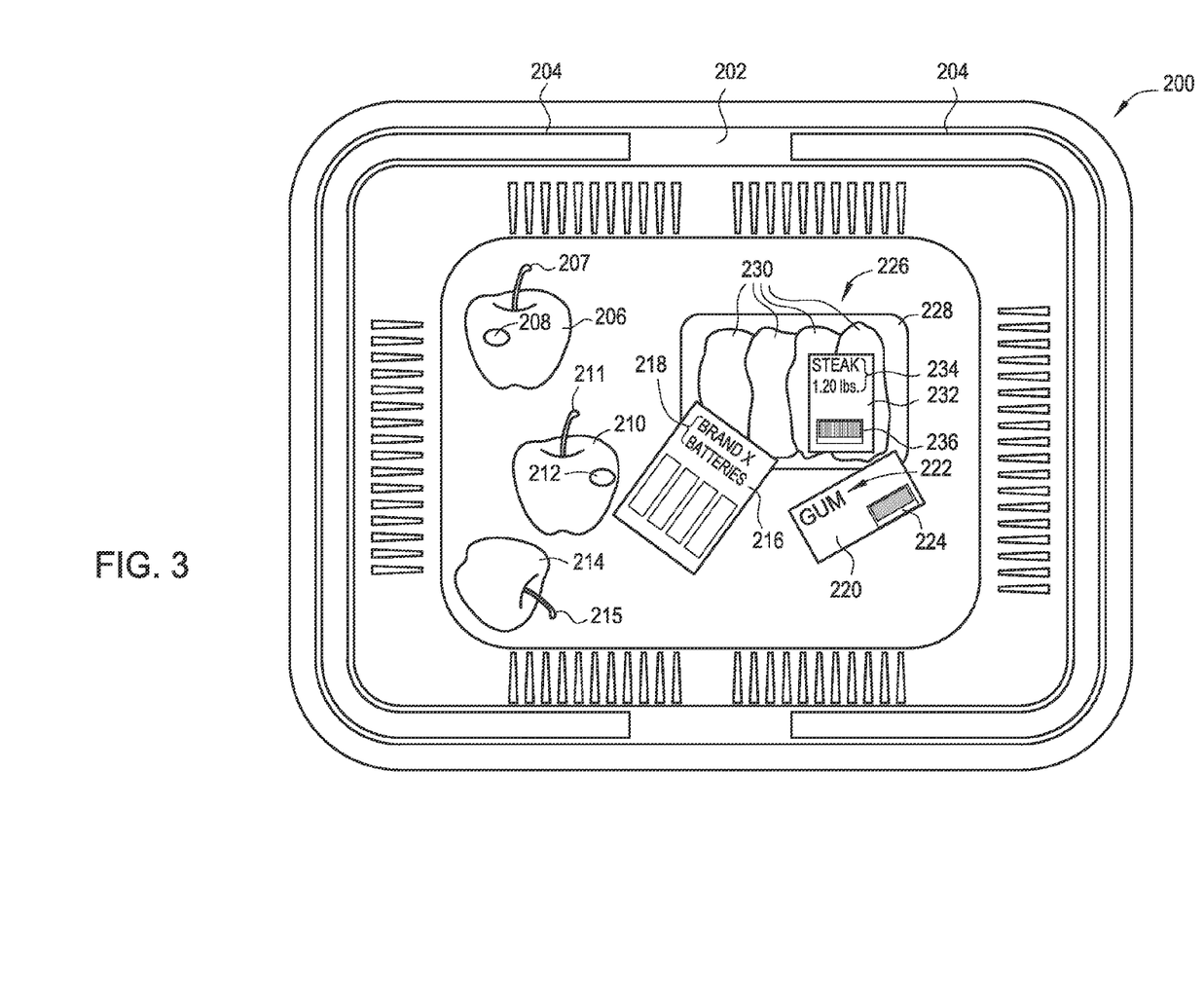
FIG. 3 is an exemplary top down image of items in a shopping basket that could be captured by a video camera.

FIG. 3 illustrates an exemplary image 200 of a shopping basket 202 containing items for purchase that a customer has placed on the scale 104 of the kiosk 100. For example, the image 200 could have been captured by the video camera 108. Since the shopping basket 202 is not being purchased, the empty weight and center of mass of the shopping basket 202 need to be removed from the weight and center of mass of the shopping basket 202 and items therein measured by the load cells 106. The computer memory 122 (shown in FIG. 1) could store a data structure that includes the weight of the basket 202 and a center of mass for the basket 202. The shopping basket 202 includes handles 204 that are shown in a stowed position. With the handles 204 stowed as shown in FIG. 3, the center of mass for the empty shopping basket 202 could be at the center of the shopping basket 202. In various instances, a customer may leave one or both of the handles 204 in an upright position or in another position (e.g., one handle 204 angled toward the other handle 204), resulting in a different center of mass for the empty shopping basket 202. In various aspects, the computer processor 120 can recognize the position of the handles 204 and may determine a different center of mass for the shopping basket 202 based on the position of the handles 204. With the weight and center of mass of the empty shopping basket 202 known, the computer processor 120 can add the weight and center of mass of the empty shopping basket 202 to the estimated weight and estimated center of mass of the items in the basket 202 for security checks, described below. In various instances, the customer may not use a basket, instead placing items directly on the platen 105 of the kiosk 100. In such instances, the computer processor 120 would not have to subtract the weight and center of mass of the basket 202 for security checks, described below.

The image 200 in FIG. 3 includes several items in the shopping basket 202. For example, the shopping basket 202 includes three apples 206, 210, and 214. A first apple 206 has a first visible label 208 and the second apple 210 has a second visible label 212. The computer processor 120 may perform text recognition on the first label 208 and the second label 212 to identify the varietal types of the first apple 206 and the second apple 210, respectively. For example, the labels 208 and 212 could include a four digit code commonly used to identify produce. As another example, the labels 208 and 212 could include the name of the varietal type. The third apple 214 does not have a visible label. In such instances, the computer processor 120 can compare the image of the third apple 214 to images of produce stored in a data structure (e.g., in a database stored in computer memory 122) using image recognition to identify the varietal type of the third apple 214. The video camera 108 and the captured image 200 could be calibrated so that one or more dimensions of the images of the apples 206, 210, and 214 can be determined. For example, the digital camera 108 could be arranged relative to the platen 105 such that one pixel of the digital image 200 is equal to 0.0025 inches at the surface of the platen 105. By counting pixels that make up an image of an item, certain dimensions of the item can be determined. Objects on top of the platen 105 (e.g., the items in the shopping basket) would be slightly closer to the camera such that one pixel would equal to a smaller distance on an image of the closer objects. In various instances in which the camera 108 is mounted at a relatively large distance from the platen 105, such as the ceiling of the store, the small scale differences caused by some objects being closer to the camera 108 than others can be ignored. In various aspects, two or more cameras could be used to capture a stereo image of the objects on the platen 105 and identify distances to the cameras of the objects. Then, a pixel size scale could be established for each object. In various aspects, other systems could be used to determine a distance and a pixel size scale for different objects at different distances from the camera 108. Examples of such systems include ultrasonic sensors and laser ranging systems that measure range. The determined dimensions of the items could be applied to weight metrics to calculate an estimated weight for the items. For example, a data structure of weight metrics (e.g., stored in computer memory 122) could include volume metrics that are based on measured heights of different varietal types of apple. Using image recognition technology, the computer processor 120 could identify the a stem 207 of the first apple 206 and measure a distance of the apple extending from the stem 207 to an opposite side of the apple and identify this distance as the height of the first apple 206. The computer processor 120 could also identify a stem 211 of the second apple 210 and a stem 215 of the third apple 214 and calculate respective heights in a similar manner. The computer processor could then calculate respective volumes based on the volume metrics for the identified varietal types of apples. The data structure of weight metrics could also include densities for the different varietal types of apples. The computer processor 120 could estimate weights of the first apple 206, the second apple 210, in the third apple 214 based on the calculated volumes of the apples and the density metrics from the data structure.

The image 200 also includes a pack of batteries 216 in the shopping basket 202. The pack of batteries 216 includes a label 218 stating "BRAND X BATTERIES." The processor 120 could perform text recognition on the label 218 to identify the pack of batteries 216. A data structure stored in computer memory 122 could include a weight of the pack of batteries 216. The image 200 also includes a pack of gum 220. The pack of gum 220 includes a label 222 as well as a barcode 224. The computer processor 120 could perform text recognition on the label 222 and/or could read the barcode 224 to identify the pack of gum 220. A data structure stored in computer memory 122 could include a weight of the pack of gum 220.

The image 200 also includes a package of steaks 226. In the exemplary image 200, the package of steaks 226 includes four steaks 230 prepackaged on a Styrofoam tray 228. Although not shown, the package of steaks 226 is likely wrapped with plastic film, or the like. The package of steaks 226 includes a label 232. The label 232 includes a text description of the item that includes a weight. Here, the weight of the steaks on the label 232 is identified as 1.20 pounds. The weight identified on the label 232 could omit the weight of the tray 228. The label 232 also includes a barcode 236. The computer processor 120 could perform text recognition on the label 232 to identify the weight of the item. Alternatively, the computer processor 120 could read the barcode to identify the product in the weight. The processor 120 could access a data structure stored in memory 122 to determine the weight of the tray 228 and/or the weight of plastic wrap and add the weights to the weight of the steaks.

Figure 4:
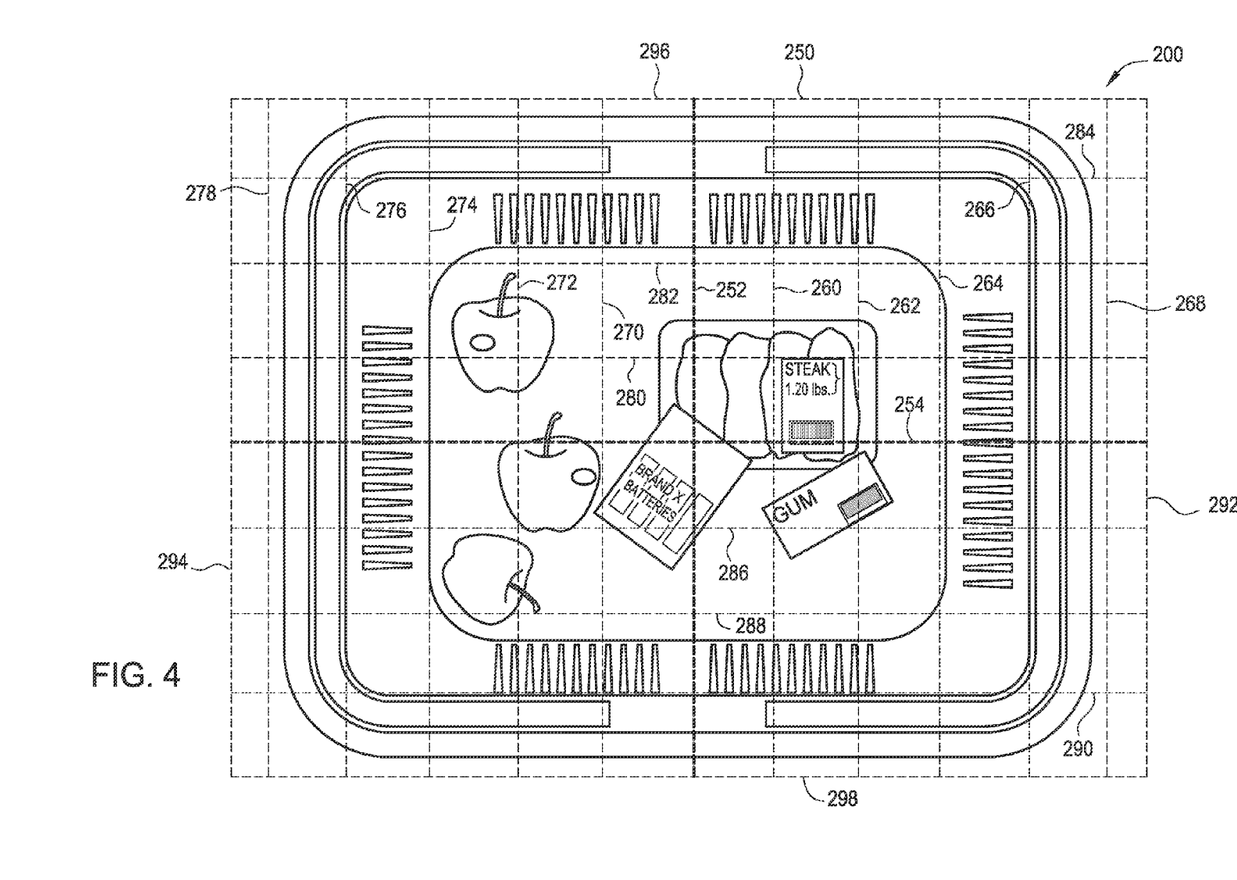
FIG. 4 is the top down image of the items in the shopping basket shown in FIG. 3 with an exemplary location grid overlaid.

The computer processor 120 could apply a location reference frame to the image 200 to provide locations of the items in the basket and/or on the platen 105. FIG. 4 illustrates the image 200 of the basket in the items therein with an exemplary orthogonal grid 250 overlaid thereon for illustration purposes. The orthogonal grid 250 includes a first axis 252 and a second axis 254. In one aspect, the first axis 252 could be a y axis in an x-y coordinate reference frame and the second axis 254 could be an x axis in the x-y coordinate reference frame. The first axis 252 and second axis 254 intersect at an x value of 0 inches and a y value of 0 inches. The orthogonal grid 250 also includes additional grid lines at various units away from the y axis 252 and the x axis 254. For example, the orthogonal grid 250 includes grid lines 280, 282, and 284, which indicate positive units along the y axis 252. For example, each grid line 280, 282, and 284 could denote a distance of two inches from the y axis 252 and/or adjacent grid lines. The orthogonal grid 250 also includes grid lines 286, 288, and 290, which indicate negative units along the y-axis 252. The orthogonal grid 250 also includes grid lines 260, 262, 264, 266, and 268, which indicate positive units along the x axis 254. The orthogonal grid 250 also includes grid lines 270, 272, 274, 276, and 278, which indicate negative units along the x-axis 254. The orthogonal grid 250 also includes grid lines 292, 294, 296, and 298, which indicate outer boundaries of the orthogonal grid 250. In various aspects, the outer boundaries of the orthogonal grid 250 are aligned with outer boundaries of the image 200. In various aspects, the outer boundaries of the orthogonal grid 250 are aligned with outer boundaries of the platen 105. In various aspects, other reference frames could be used. For example, a pixel structure of the digital image could be used as an orthogonal reference frame. As another example, a polar coordinate reference frame could be used. For illustration and explanatory purposes, the orthogonal grid 250 shown in FIG. 4 will be used in the following figures and a spacing of two inches between grid lines will be used.

Figure 5:
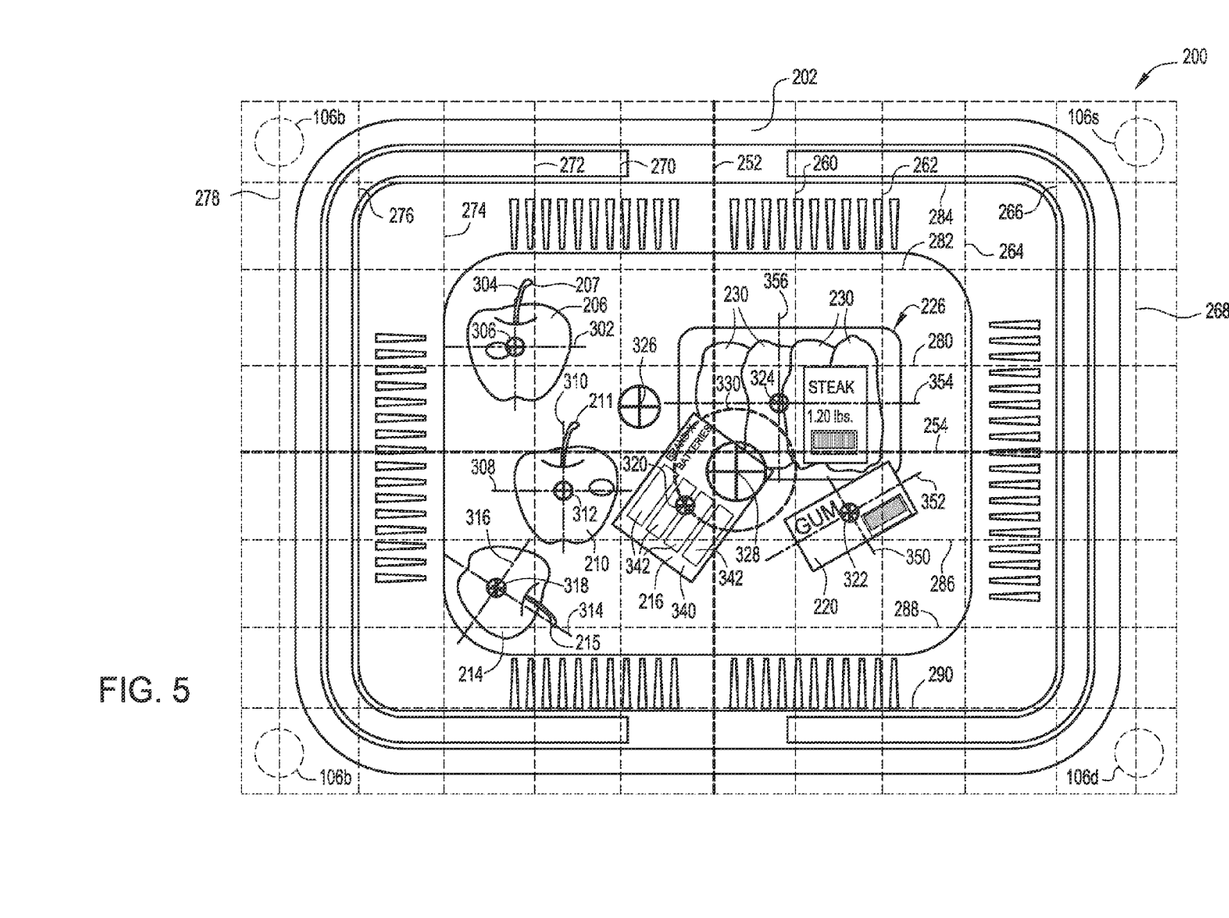
FIG. 5 is the top down image of the items in the shopping basket with the exemplary location grid overlaid shown in FIG. 4 with estimated centers of mass of each of the items, an estimated center of mass of all of the items, and a measured center of mass of all of the items are overlaid on the image.

Referring now to FIG. 5, the processor 120 can estimate centers of mass for each of the items in the image 200. For irregularly-shaped objects like the apples 206, 210, and 214, the center of mass could be estimated by drawing lines through each of the images of the apples 206, 210, and 214 that approximately divide each of the apples into two equal areas. For example, for a first apple 206, the processor 120 could draw a first line 302 that divides the apple 206 into approximately equal areas above the line 302 and below the line 302. The processor could also draw a second line 304 that divides the apple 206 into approximately equal areas to the left of the line 304 and to the right of the line 304. The first line 302 and the second line 304 could be at any angle (e.g., orthogonal or non-orthogonal) to each other than parallel. The center of mass 306 of the first apple 206 can be estimated at the location where the first line 302 and the second line 304 intersect. If more than two lines are drawn through an apple, it is possible that the lines may not intersect at the same point. In such instances, a region in which the lines intersect can be defined and the center of mass can be estimated to be within the region. Using the reference frame of the orthogonal grid 250, the center of mass 306 of the first apple 206 in the exemplary image 200 is located at an (x,y) location of approximately (−4.3, 2.3) inches because the center of mass 306 is past the first grid line 270 and the second grid line 272 to the left of the first axis 252 (which denotes a location of zero inches along the second axis 254) and the center of mass 306 is past the first grid line 280 above the second axis 254 (which denotes a location of zero inches along the first axis 252). As discussed above, each grid line in this exemplary illustration is equal to a distance of two inches. Thus, the center of mass 306 is a little more than four inches to the left of zero inches along the x axis (second axis 254) and a little more than two inches above zero inches along the y axis (first axis 252). The processor 120 can draw lines 308 and 310 on the image of a second apple 210 to determine a center of mass 312 of the second apple 210 in a similar manner. The processor 120 can draw lines 314 and 316 on the image of a third apple 214 to determine a center of mass 318 of the third apple 214 in a similar manner. The location of the center of mass 312 of the second apple 210 in the exemplary image 200 is approximately located at (−3.25, −1.0) inches. The location of the center of mass 318 of the third apple 214 in the exemplary image 200 is approximately located at (−4.75, −3.0) inches.

The processor 120 can estimate the center of mass 322 for the image of the gum 220 in a similar manner to the apples 206, 210, and 214 because the gum 220 likely has a nearly-uniform density across its packaging. The processor 120 could draw lines 350 and 352 that divide the image of the package of gum 220 into equal areas, and the center of mass 322 could be located at the intersection of the lines 350 and 352. The location of the center of mass 322 of the package of gum 220 in the exemplary image 200 is approximately located at (3.25, −1.5) inches.

In various instances, the processor 120 may rely on information stored in a data structure to identify the center of mass 320 of the package of batteries 216 because the package of batteries 216 does not have a uniform density. For example, the package of batteries 216 may include a cardboard backing 340 and four batteries 342 arranged closer to one end of the cardboard backing 340. Since the batteries 342 are substantially heavier than the cardboard backing 340, the center of mass 320 of the package of batteries 216 will be not be co-located with the center of the image of the package of batteries 216. Rather, the center of mass 320 of the package of batteries 216 will be closer to a center of mass of the batteries 342, exclusive of the cardboard backing 340. A data structure (e.g., stored in the memory 122) could include information regarding the center of mass 320 of the pack of batteries 216. The data structure could include information regarding the center of mass 320 of the pack of batteries 216 from multiple angles of view so that the center of mass 320 can be determined regardless of whether the front, back, or a side of the pack of batteries 216 is visible in the image 200. The location of the center of mass 320 of the package of gum 216 in the exemplary image 200 is approximately located at (−0.75, −1.3) inches.

For the package of steak 226, the processor 120 could use a blended approach to determine the center of mass 324 of the package of steak 226. For example, the tray 228 of the package of steak 226 likely has a known center of mass at a geometric center of the tray 228. By contrast, the center of mass of the steaks 230 will depend on the shape(s) of the steaks 230 and their placement on the tray 228. Again, the processor 120 could draw lines 354 and 356 through the steaks 230 to divide the steak into approximately equal areas and designate the point or region where the lines intersect as the center of mass of the steaks 230. The center of mass 324 of the package of steaks 226 could then be calculated based on the known mass and center of mass of the tray 228, the known mass of the steaks 230, and the estimated center of mass of the steaks 230. In various aspects, the mass of the tray 228 may be insignificant and could be ignored. As shown in FIG. 5, the individual steaks 230 are touching and could be treated as one large steak. In various instances, the steaks 230 may not be touching. In such instances, the weights of the individual steaks could be estimated by estimating the size of each of the steaks 230 relative to the other steaks and apportioning the total weights of the steaks 230 (determined from the label 232) based on their relative sizes. For example, if there are two steaks in a package that total one pound in weight and a first steak is estimated to be twice as large as a second steak, then the first steak could be estimated to weigh 0.66 pounds and the second steak could be estimated to weigh 0.33 pounds. The centers of mass of each of the two steaks can be calculated, as described above, by arranging lines through each steak that approximately divide the steak into equal areas and identifying the center of mass as the location where the lines intersect. The center of mass of the package of steaks 228 can then be determined based on the estimated weights and centers of mass of the individual steaks. The location of the center of mass 324 of the package of steaks 226 in the exemplary image 200 is approximately located at (1.6, 1.1) inches.

Once the masses and centers of mass of the items in the image 200 have been estimated and/or retrieved, a total estimated mass and an estimated cumulative center of mass 326 can be estimated. For example, using the reference grid 250 shown in FIG. 4, the total estimated mass can be calculated by equation (1) and estimated center of mass can be estimated by equations (2) and (3):

$$M_T = M_1 + M_2 + \ldots + M_n + M_{Basket}; \quad (1)$$

$$LOC\_X = \frac{(LOC\_X_1 \cdot M_1) + (LOC\_X_2 \cdot M_2) + \ldots + (LOC\_X_n \cdot M_n) + (LOC\_X_{Basket} \cdot M_{Basket})}{M_T}; \quad (2)$$

and $$LOC\_Y = \frac{(LOC\_Y_1 \cdot M_1) + (LOC\_Y_2 \cdot M_2) + \ldots + (LOC\_Y_n \cdot M_n) + (LOC\_Y_{Basket} \cdot M_{Basket})}{M_T}; \quad (3)$$

wherein $M_T$ is the total mass, $M_i$ is the mass of the ith item, $M_{Basket}$ is the mass of the basket, LOC_X is the estimated location of the cumulative center of mass along the x axis, LOC_Y is the estimated location of the cumulative center of mass along the y axis, $LOC\_X_i$ is the estimated location of the center of mass of the ith item along the x axis, $LOC\_Y_i$ is the estimated location of the center of mass of the ith item along the y axis, $LOC\_X_{Basket}$ is the location of the center of mass of the basket along the x axis, and $LOC\_Y_{Basket}$ is the location of the center of mass of the basket along the y axis.

As discussed above (and below) the estimated total weight and estimated cumulative center of mass can be compared to a measured total weight and measured center of mass. A measured total weight and measured center of mass 328 can be calculated using the load cells 106a, 106b, 106c, and 106d of the scale 104. FIG. 5 illustrates an exemplary arrangement of the four load cells 106a, 106b, 106c, and 106d overlaid on the image 200. For the four load cells, the total mass can be given by equation (4):

$$M_{MEAS.} = M_{LC\_106a} + M_{LC\_106b} + M_{LC\_106c} + M_{LC\_106d} \quad (4)$$

wherein $M_{MEAS.}$ is the total measured weight of the items on the load cells and $M_{LC\_106i}$ is the measured weight at load cell 106i. The measured center of mass can be determined in the x axis and the y axis according to equations (5) and (6), respectively:

$$MEAS\_LOC\_X = \frac{((M_{LC\_106c} + M_{LC\_106d}) \cdot (D_X)) + ((M_{LC\_106a} + M_{LC\_106b}) \cdot (-D_x))}{M_{MEAS.}}; \quad (5)$$

and $$MEAS\_LOC\_Y = \frac{((M_{LC\_106b} + M_{LC\_106c}) \cdot (D_y)) + ((M_{LC\_106a} + M_{LC\_106d}) \cdot (-D_y))}{M_{MEAS.}}; \quad (6)$$

wherein MEAS_LOC_X is the measured location of the center of mass along the x axis, MEAS_LOC_Y is the measured location of the center of mass along the y axis, $D_x$ is the location of a load cell along the x axis, and $D_y$ is the location of a load cell along the y axis. Assuming, for purposes of illustration, that each grid line is equal to two inches, each load cell is arranged 7 inches from the x axis and 10 inches from the y axis, then $D_x$ would be equal to 10 and $D_y$ would be equal to 7.

As shown in FIG. 5, the measured center of mass 328 and measured weight could be different than the estimated center of mass 326 and estimated weight if the estimated weights and/or estimated centers of mass of the items in the image 200 are inaccurate. The measured center of mass 328 and measured weight could also be different than the estimated center of mass 326 and estimated weight if the basket 202 includes one or more items that are not visible. For example, the package of steaks 226 could be on top of a second pack of gum such that the second pack of gum is not visible in the image 200. For the purposes of a security check, an error threshold around the measured center of mass 328 can be established so that minor discrepancies between the measured center of mass 328 and measured total weight and the estimated center of mass 326 and estimated total weight do not trigger alerts. If the estimated center of mass 326 lies within the error threshold surrounding the measured center of mass 328, then any discrepancy between the estimated center of mass 326 and the measured center of mass 328 could be determined to be insignificant, and no alert would be generated. For example, FIG. 5 illustrates an exemplary error tolerance threshold 330 surrounding the measured center of mass 328. Continuing the exemplary scenario in which the grid lines are 2 inches apart, the exemplary error threshold 330 has a radius (i.e., threshold amount) of approximately 1.5 inches around the measured center of mass 328. If the estimated center of mass 326 is within the exemplary error threshold 330, then the processor 120 would not output an alert based on a discrepancy between the measured center of mass 328 and the estimated center of mass 326. By contrast, as shown in FIG. 5, if the estimated center of mass 326 is outside of the exemplary error threshold 330, then the processor 120 could output an alert based on the discrepancy between the measured center of mass 328 and the estimated center of mass 326.

The size of the error threshold could vary depending on different factors. For example, the sizes of items in the basket 202 could result in a larger or smaller error threshold. As a first exemplary illustration, if a customer has a twenty pound turkey in a shopping basket, additional small items that may be in the shopping basket 202 (or errors in the weights and/or placement of the small items) would not significantly affect the center of mass of the shopping basket. By contrast, in a second exemplary illustration, if a customer only has several relatively small items in the shopping basket, small errors in the estimated weights or centers of mass of the items could significantly affect the estimated cumulative center of mass. As a result, a larger error threshold may be used in the former illustration than the latter illustration to provide a tolerance appropriate to the circumstances.

As discussed above, in addition to determining whether there is any discrepancy between the estimated center of mass 326 and the measured center of mass 328, the processor 120 can also determine whether there is any discrepancy between the measured weight and the estimated weight. Again, an error threshold for total weight can be established so that minor errors in estimated weights do not cause an alert to be output by the processor 120. The error threshold for total weight could vary depending on different factors. For example, the error threshold for total weight may be relatively large for instances where a shopping basket includes several items in which the weight has to be estimated based on the image (e.g., image 200), such as produce. By contrast, the error threshold for total weight may be relatively small for instances where a shopping basket includes mostly items with items that have known weights, such as boxed goods (e.g., crackers and cereal), canned goods (e.g., canned vegetables and soups), and other goods, like packs of gum. If the estimated center of mass is outside of the error threshold for the measured center of mass and/or if the estimated total weight is outside the error threshold for the measured total weight, the processor 120 can output an alert.

Figure 6:
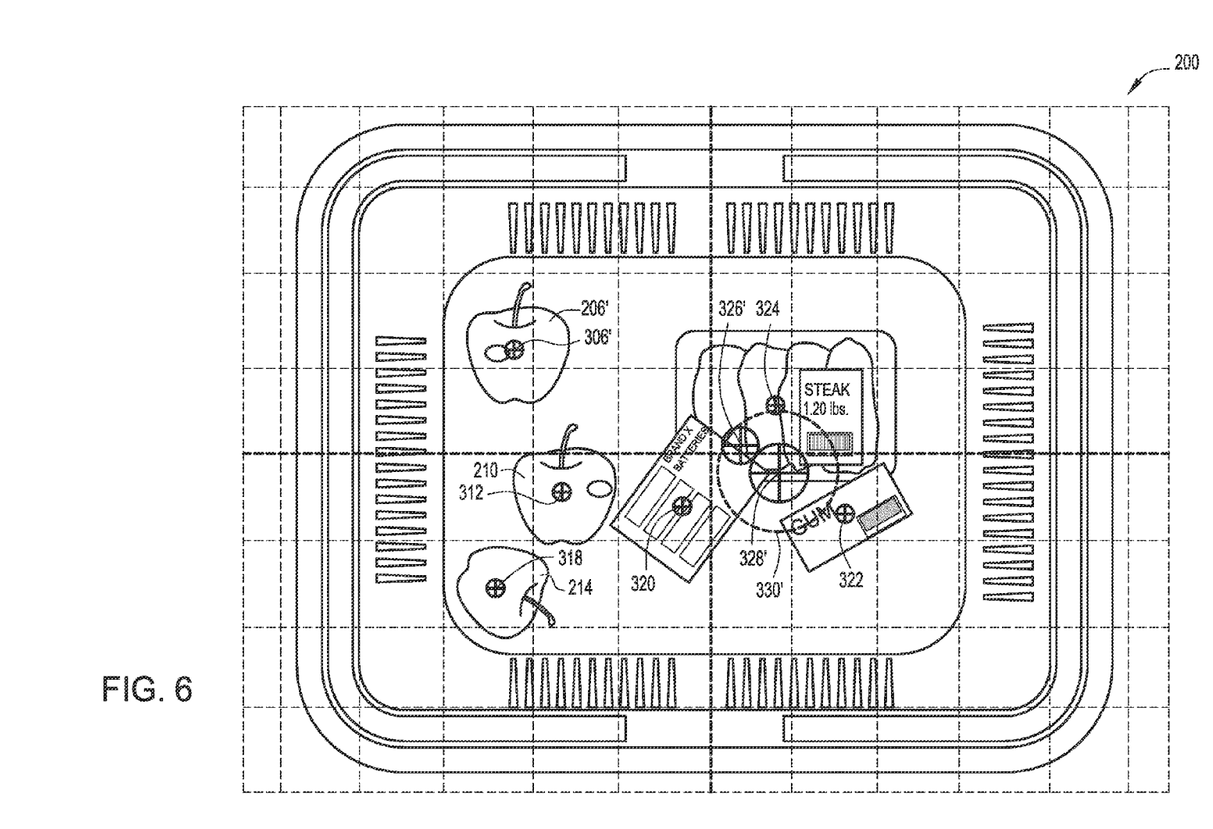
FIG. 6 is a top down image of the items in the shopping basket with the exemplary location grid overlaid shown in FIG. 4 after one of the items has been moved, wherein estimated centers of mass of each of the items, an estimated cumulative center of mass of all of the items, and a measured cumulative center of mass of all of the items are overlaid on the image.

The processor 120 could output an alert that causes the light 116 associated with the kiosk 100 to illuminate. The processor 120 could also output an alert that includes an instruction on the display 112 to the customer and/or to a store employee to rearrange the items in the basket 202 to try to resolve any discrepancy. For example, in the exemplary scenario shown in FIG. 5, the processor 120 could output an alert that includes an instruction to remove one of the apples from the basket 202 and then replace the apple. For example, the processor 120 could output an instruction for the customer to remove apple 206. Removing an apple could be the most-likely action to resolve the discrepancy in this exemplary scenario because its weight has been estimated. By measuring the total weight (using the load cells 106a, 106b, 106c, and 106d) before and after the apple 206 is removed, the actual weight of the apple 206 can be determined. Thereafter, the estimated weight for the apple 206, calculated as described above, can be replaced with the actual weight. Furthermore, when the customer replaces the apple 206 in the basket 202, the customer will likely place the apple 206 in a different location. FIG. 6 illustrates an exemplary image 200 of the basket 202 after the apple 206' after it has been replaced in the basket 202. The location of the apple 206' (and the center of mass 306' of the apple 206') has shifted to the right in the basket 202 (relative to its position shown in FIGS. 3-5). Accordingly, the measured center of mass 328' and the estimated center of mass 326' have also shifted to the right. Additionally, as described above, the actual weight of the apple 206 is now known, which may improve the calculation of the estimated cumulative center of mass 326'. Consequently, in this exemplary illustration, the estimated cumulative center of mass 326' is now within the error threshold 330' of the measured center of mass 328'.

In various instances, as described above, a difference between the measured weight of the basket 202 and the estimated weight may differ by more than the error threshold. For example, the measured total weight of the basket 202 may be heavier than the estimated total weight. In such instances, an item may be heavier than estimated and/or an item in the basket 202 may not be visible in the image 200. Referring again to the exemplary illustration in FIG. 5, in the event the measured total weight of the basket 202 is heavier than the estimated weight, the processor 120 could identify the location of the basket corresponding to the package of steak 226 and the package of batteries 216 as possibly obscuring the view of another item since the measured center of mass 328 is closer to those items than the estimated center of mass 326 predicts. The processor 120 could output an instruction to remove the package of steaks 226 and/or the package of batteries 216 from the basket 202 to determine whether any additional items may be discovered in a subsequent image 200 of the basket 202.

In the event that any discrepancies between an estimated total weight and a measured total weight and/or any discrepancies between an estimated cumulative center of mass and a measured center of mass of the basket 202 cannot be resolved quickly, an employee may perform a more significant analysis to resolve the discrepancies. For example, in the event the processor 120 detects a discrepancy, the processor 120 can first output an alert that informs the customer of the discrepancy and instructs the customer to take an action (e.g., remove and replace an item, described above). In various aspects, the customer may be provided with more than one instruction to resolve the discrepancy. In the event the action does not resolve the discrepancy, the processor 120 can output an alert that causes the light 116 on the kiosk 100 to illuminate to summon a store employee. The employee could take additional steps, such as performing additional instructions provided by the computer processor.

Figure 7:
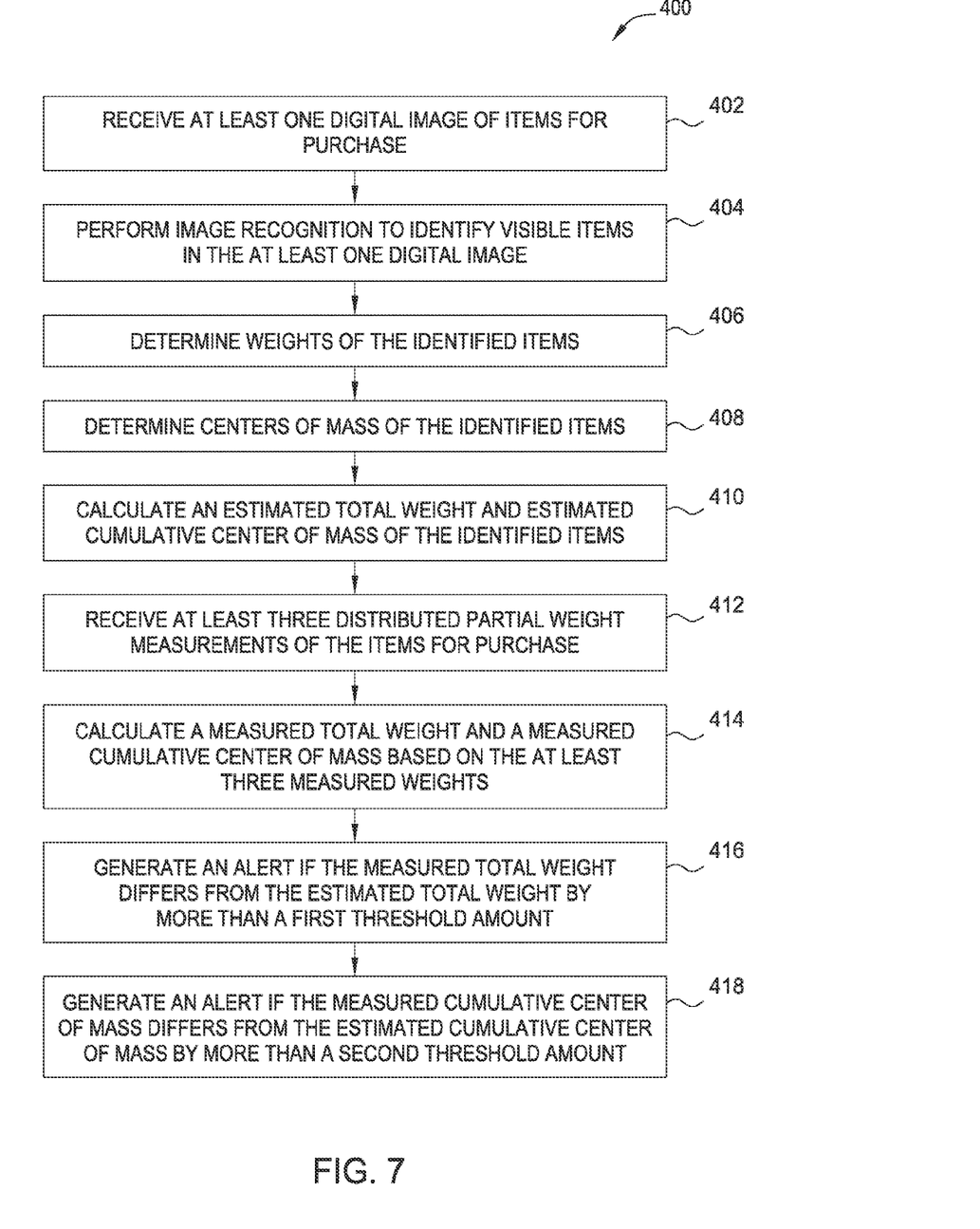
FIG. 7 is a flow chart for a method according to at least one aspect for performing a security check based on an estimated total weight and cumulative center of mass from an image of items for purchase and a measured total weight and cumulative center of mass for the items.

FIG. 7 is a flow chart for a method 400 for performing a security check on items for purchase. In block 402, at least one digital image of items for purchase is received. As discussed above, one or more cameras can be arranged at a self-checkout kiosk to capture digital images of items in a customer's shopping basket, shopping cart, or items that have been placed on a scale. In block 404, image recognition is performed on the digital image(s) to identify visible items in the digital image(s). In block 406, weights of the identified visible items are determined. As discussed above, for certain items such as canned goods, boxed goods, and/or other certain prepackaged items, the weight may be known and looked up from a data structure (e.g., a database). For certain other items, a weight may be printed on a label, and text recognition can be used to read the label and ascertain the weight. For other items, such as fruits and vegetables, an estimated size of the item can be determined, and an estimated weight can be calculated from a weight metric (e.g., a density metric) stored in a data structure. In block 408, centers of mass of the identified visible items are estimated. For certain prepackaged goods that have a uniform density (e.g., a pack of gum), the center of mass may be identified by a identifying a center of the image of the item. For other items, such as produce, a center of mass may be estimated by drawing two or more lines through each item, wherein each line divides the image of the item into two equal areas. A point or region where the lines intersect can be identified as the estimated center of mass for the item. For other items that have an uneven weight distribution, a location of a center of mass for the item may be retrieved from a data structure. In block 410, an estimated total weight and estimated center of mass for all of the identified visible items can be calculated. The estimated total weight could be the sum of the estimated weights of the individual items. The estimated center of mass could be a weighted average of the centers of mass of the individual items, wherein the weighting is based on the estimated weights of the individual items.

In block 412, weight readings from at least three load cells of a scale on which the items are placed are received. In block 414, a measured total weight can be determined by adding the weight readings from the at least three load cells together. A measured center of mass can be calculated based on a known geometrical relationship of the load cells to each other and the weight readings for each load cell relative to the measured total weight. In block 416, an alert can be generated in the event the measured total weight differs from the estimated total weight by more than a first threshold amount. In block 418, an alert can be generated in the event the measured center of mass differs from the estimated center of mass by more than a second threshold amount. A generated alert can include an instruction to the customer and/or to a store employee to rearrange items on the scale and/or in the basket to try to resolve any discrepancy between the measured total weight and center of mass and the estimated total weight and center of mass. For example, the generated alert may include an instruction to remove a particular item from the scale and then replace the item on the scale. In the event that discrepancies above the first threshold amount and/or the second threshold amount cannot be resolved by rearranging items on the scale and/or in the basket, the customer may be directed to an employee for an alternate means of checkout.

The descriptions of various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the preceding, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system."

The present disclosure may be embodied as a system, a method, and/or a computer program product. The computer program product may include a computer-readable storage medium (or media) having computer-readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present disclosure, other and further embodiments of the disclosure may be devised without departing from the basic scope thereof, and the scope thereof is determined by the claims that follow.

What is claimed is:

1. A computer-implemented method for verifying a plurality of items for purchase, comprising:
   receiving a digital image, from at least one digital camera, of a plurality of items supported by a platen of a scale;
   receiving partial weight measurements from a plurality of load cells supporting the platen, wherein the partial weight measurements correspond to the plurality of items supported by the platen;
   performing image recognition on the received digital image to identify the plurality of items;
   determining estimated weights for the identified plurality of items in the received digital image;
   calculating estimated locations of centers of mass for the identified plurality of item relative to the platen using the received digital image;
   calculating, using a computer processor, an estimated location of a cumulative center of mass for the plurality of items in the digital image, based on the respective determined estimated weights and calculated estimated locations of centers of mass for the plurality of items, wherein the estimated location of the cumulative center of mass is relative to the platen of the scale;
   calculating, using the computer processor, a location of a measured cumulative center of mass for the items, based on the partial weight measurements received from the plurality of load cells supporting the platen; and
   generating an alert upon the estimated location of the cumulative center of mass for the items differing from the location of the measured cumulative center of mass by at least a first threshold amount.

2. The computer-implemented method of claim 1, wherein performing image recognition comprises at least one of:
   performing text recognition to identify an item from a label associated with the item;
   performing text recognition to identify an item from product art associated with the item;
   reading a bar code associated with an item to identify the item; and
   comparing the digital image of an item to reference images of items stored in a data structure to identify the item.

3. The computer-implemented method of claim 2, wherein determining weights of the identified items comprises:
   for a first identified item, estimating dimensions of the item from the received digital image of the items for purchase;

retrieving, from a computer data structure, a dimension-based weight metric for the first identified item; and
calculating an estimated weight for the first item, based on the estimated dimensions and the dimension-based weight metric.

4. The computer-implemented method of claim 2, wherein determining weights of the identified items comprises:
for a first identified item, retrieving, from a computer data structure, a known weight of the first identified item.

5. The computer-implemented method of claim 1, wherein generating the alert comprises:
providing an instruction to pick up one of the items from a scale on which the items were placed and to then replace the item on the scale.

6. The computer-implemented method of claim 1, wherein generating the alert comprises:
providing an instruction to rearrange at least one of the items on a scale on which the items were placed.

7. The computer-implemented method of claim 1, further comprising:
outputting, for display on a computer display screen:
one of the at least one digital images;
an indication of the estimated weights of the items in the digital image;
a location of the estimated cumulative center of mass; and
a location of the measured cumulative center of mass.

8. A system, comprising:
a scale, comprising:
a platen that includes a surface that can support the items for purchase; and
at least three load cells arranged to support the platen and the items for purchase, wherein each of the load cells supports a partial weight of the total weight of the items for purchase, and wherein each of the load cells outputs a partial weight signal;
at least one digital camera arranged to capture at least one digital image of items on the platen for purchase by a customer;
a display device; and
a computer processor in communication with the at least one digital camera and the scale, wherein the computer processor is configured to:
calculate an estimated cumulative center of mass for items visible in the at least one image;
calculate a measured cumulative center of mass for the items, based on the partial weight signals received from the at least three load cells; and
output an alert to the display device upon the estimated cumulative center of mass for the items differing from the measured cumulative center of mass by at least a first threshold amount.

9. The system of claim 8, wherein the processor calculates an estimated cumulative center of mass for the items visible in the image, in part, by performing image recognition of the items, wherein the computer processor performs image recognition by at least one of:
performing text recognition to identify an item from a label associated with item;
performing text recognition to identify an item from product art associated with the item;
reading a bar code associated with an item to identify the item; and
comparing the digital image of an item to reference images of items stored in a data structure in a computer memory to identify the item.

10. The system of claim 9, wherein the processor calculates an estimated cumulative center of mass for the items visible in the image, in part, by determining weights of the identified items, wherein the computer processor determines weights of the identified items by:
for a first identified item, estimating dimensions of the item from the received digital image of the items for purchase;
retrieving, from a computer data structure stored in a computer memory, a dimension-based weight metric for the first identified item; and
calculating an estimated weight for the first item, based on the estimated dimensions and the dimension-based weight metric.

11. The system of claim 9, wherein the processor calculates an estimated cumulative center of mass for the items visible in the image, in part, by determining weights of the identified items, wherein the computer processor determines weights of the identified items by, for a first identified item, retrieving from a computer data structure stored in computer memory, a known weight of the first item.

12. The system of claim 8, wherein the alert includes an instruction on the display screen to pick up one of the items from the platen and then to replace the item on the platen.

13. The system of claim 8, wherein the alert includes an instruction on the display screen to rearrange at least one of the items on the platen.

14. The system of claim 8, wherein the display device displays at least one of:
a digital image captured by the at least one digital camera;
an indication of the estimated weights of the items in the digital image;
a location of the estimated center of mass; and
a location of the measured center of mass.

15. A computer program product, the computer program product comprising:
a non-transitory computer-readable storage medium having computer-readable program code embodied therewith, the computer-readable program code executable by one or more computer processors to implement a method for verifying a plurality of items for purchase, comprising:
receiving a digital image of a plurality of items supported by a platen of a scale;
receiving partial weight measurements from a plurality of load cells supporting the platen, wherein the partial weight measurements correspond to the plurality of items supported by the platen;
performing image recognition on the received digital image to identify the plurality of items;
determining estimated weights for the identified plurality of items in the digital image;
calculating estimated locations of centers of mass for the identified plurality of item relative to the platen using the received digital image;
calculate an estimated location of a cumulative center of mass for the plurality of items in the image, based on the respective determined estimated weights and calculated estimated locations of centers of mass for the plurality of items, wherein the estimated location of the cumulative center of mass is relative to the platen of the scale;
calculate a location of a measured cumulative center of mass for the items, based on the partial weight measurements received from the plurality of load cells supporting the platen; and generate an alert upon the estimated location of the cumulative center of mass for the items differing from the location of the measured cumulative center of mass by at least a first threshold amount.

16. The computer program product of claim 15, wherein the computer-readable program code performs image recognition by at least one of:

performing text recognition to identify an item from a label associated with item;

performing text recognition to identify an item from product art associated with the item;

reading a bar code associated with the item; and comparing the digital image of an item to reference images of items stored in a data structure in a computer memory.

17. The computer program product of claim 16, wherein the computer-readable program code determines weights of the identified items by:

for a first identified item, estimating dimensions of the item from the received digital image of the items for purchase;

retrieving, from a computer data structure, a dimension-based weight metric for the first identified item; and calculating an estimated weight for the first item, based on the estimated dimensions and the dimension-based weight metric.

18. The computer program product of claim 16, wherein the computer-readable program code determines weights of the identified items by:

for a first identified item, retrieving, from a computer data structure, a known weight of the first identified item.

19. The computer program product of claim 15, wherein the generated alert includes an instruction to rearrange at least one of the items on a scale on which the items were placed.

20. The computer program product of claim 15, wherein the generated alert includes an instruction to pick up one of the items from a scale on which the items were placed and to then replace the item on the scale.

* * * * *